US009146738B2

(12) United States Patent
Morris

(10) Patent No.: US 9,146,738 B2
(45) Date of Patent: *Sep. 29, 2015

(54) INTERLEAVING BITS OF MULTIPLE INSTRUCTION RESULTS IN A SINGLE DESTINATION REGISTER

(75) Inventor: Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1513 days.

This patent is subject to a terminal disclaimer.

(21) Appl. No.: 12/254,687

(22) Filed: Oct. 20, 2008

(65) Prior Publication Data

US 2009/0049284 A1 Feb. 19, 2009

Related U.S. Application Data

(63) Continuation-in-part of application No. 10/112,783, filed on Mar. 30, 2002, now Pat. No. 7,441,104.

(51) Int. Cl.
*G06F 9/30* (2006.01)
(52) U.S. Cl.
CPC ........ *G06F 9/30021* (2013.01); *G06F 9/30032* (2013.01); *G06F 9/30036* (2013.01); *G06F 9/30109* (2013.01)
(58) Field of Classification Search
CPC ............ G06F 9/30021; G06F 9/30032; G06F 9/30036
USPC ............................................ 712/2, 4, 22, 220
See application file for complete search history.

(56) References Cited

U.S. PATENT DOCUMENTS

| | | | |
|---|---|---|---|
| 6,760,822 B2 * | 7/2004 | Dagan et al. | 711/157 |
| 7,174,014 B2 * | 2/2007 | Lee et al. | 380/28 |
| 7,441,104 B2 * | 10/2008 | Morris | 712/213 |
| 2001/0016902 A1 * | 8/2001 | Abdallah et al. | 712/222 |

OTHER PUBLICATIONS

Motorola, "MC88110—Second Generation RISC Microprocessor Users Manual", 1991, pp. 5-11, 6-3.*
Intel, "IA-64 Application Developer's Architecture Guide", May 1999, pp. 7-140-7-142.*
Intel, "IA-64 Application Developer's Architecture Guide", May 1999, p. 7-155.*

* cited by examiner

*Primary Examiner* — David J Huisman
(74) *Attorney, Agent, or Firm* — Clifton L. Anderson

(57) ABSTRACT

The present invention provides for parallel subword instructions that cause results to be non-contiguously stored in a result register. For example, a targeting-type instruction can specify (implicitly or explicitly) a bit position and the result of each of the parallel subword compare operations can be stored at that bit position within the respective subword location of a result register. Alternatively, for a shifting-type instruction, pre-existing contents of a result register can be shifted one bit toward greater significance while the results of the present operation are stored in the least-significant bits of respective result-register subword locations. This approach provides the results of multiple parallel subword compare instructions to be combined with relatively few instructions and reduces the maximum lateral movement of information—both of which can enhance performance.

23 Claims, 10 Drawing Sheets

| | | | | | | | | |
|---|---|---|---|---|---|---|---|---|
| PCompDOT0 | 00 | 00 | 00 | 00 | 00 | 01 | 01 | 01 | RC0 |
| OR | 00 | 00 | 00 | 02 | 00 | 03 | 03 | 03 | RD0 |
| PCompDOT1 | 00 | 00 | 00 | 02 | 00 | 02 | 02 | 02 | RC1 |
| OR | 00 | 00 | 0C | 0A | 00 | 0F | 0F | 0F | RE0 |
| PCompDOT2 | 00 | 00 | 04 | 00 | 00 | 04 | 04 | 04 | RC2 |
| OR | 00 | 00 | 0C | 08 | 00 | 0C | 0C | 0C | RD1 |
| PCompDOT3 | 00 | 00 | 08 | 08 | 00 | 08 | 08 | 08 | RC3 |
| → OR | 00 | 70 | 4C | AA | 00 | 6F | 7F | 7F | RF0 |
| PCompDOT4 | 00 | 10 | 00 | 00 | 00 | 00 | 10 | 10 | RC4 |
| OR | 00 | 30 | 00 | 20 | 00 | 20 | 30 | 30 | RD2 |
| PCompDOT5 | 00 | 20 | 00 | 20 | 00 | 20 | 20 | 20 | RC5 |
| OR | 00 | 70 | 40 | A0 | 00 | 60 | 70 | 70 | RE1 |
| PCompDOT6 | 00 | 40 | 40 | 00 | 00 | 40 | 40 | 40 | RC6 |
| OR | 00 | 40 | 40 | 80 | 00 | 40 | 40 | 40 | RD3 |
| PCompDOT7 | 00 | 00 | 00 | 80 | 00 | 00 | 00 | 00 | RC7 |

INTERLEAVING BITS OF MULTIPLE INSTRUCTION RESULTS IN A SINGLE DESTINATION REGISTER

This is a continuation in part of U.S. patent application Ser. No. 10/112,783, filed 2002 Mar. 30, now U.S. Pat. No. 7,441,104 on 2008 Oct. 21.

BACKGROUND OF THE INVENTION

The present invention relates to data processing and, more particularly, to instructions executable by data processors. A major objective of the present invention is to provide parallel subword compare instructions that achieve improved processor performance in certain situations common in multimedia applications.

Much of modern progress is associated with advances in computer technology. Typical computers include one or more processors that perform operations on data in accordance with a program of instructions. Associated with each microprocessor is an instruction set, i.e., a set of instructions that the microprocessor can execute. The performance of a processor in the context of a particular application is largely dependent on how efficiently the tasks demanded by the application can be characterized using the processor's instruction set.

As computers have become more powerful, they have been confronted with ever more demanding applications, such as real-time video manipulation. Video is typically presented as a synchronous stream of images. Each image can be described as a two-dimensional array of picture elements (pixels). Each pixel is typically described by one multi-bit (e.g., 8-bit) color value per color dimension. Many applications, e.g., video compression, group the pixels into blocks (e.g., 8×8-pixel blocks).

Common binary image operations (such as comparisons between blocks of the same or different images) can require 2×64×8 (two blocks, 64 pixels per block, 8 bits per pixel) bits of operand data to be handled concurrently. Using the increasingly prevalent 64-bit processors, a binary image block comparison can be implemented using eight pairs of 64-bit registers for the operands, with additional registers being used for storing intermediate and final results.

In all, sixty-four comparisons are called for. Each comparison results in one bit of information. In total, the sixty-four comparisons can result in a single 64-bit word that can be stored in a single result register. How efficiently these sixty-four comparisons can be made and combined is dependent on the instruction set associated with the microprocessor. When a word compare instruction is used, operands with eight data bits and filled out with fixed values must be generated. Then words are compared. Then a one-bit value is stored in the result register at a suitable bit position. Successive results must be stored in appropriate positions in the result register without erasing prior results. Thus, sixty-four compare instructions and many other instructions are required to complete an image block compare using word compare instructions.

Some processors provide for a parallel subword compare instruction. As applied to a pair of 64-bit registers, eight pairs of 8-bit subwords stored in the registers can be compared in parallel to generate an 8-bit result that can be, for example, stored in the eight least-significant bit positions of a result register. This result can be shifted to more-significant bit positions to make room for the results of parallel subword compare operations on other pairs of registers. To complete an image block compare, eight parallel subword instructions, seven shift instructions and seven OR instructions (to combine results) are required, for a total of twenty-two instructions.

The total number of instructions is dependent on the particular implementation of the parallel subword compare instruction. For example, an alternative parallel subword compare instruction, used in the Intel Itanium processor, can store eight replicas of each subword compare result in the corresponding subword location of the result register. In this case, many more ancillary instructions are required to arrange the results of the eight parallel subword compare instructions in a single result. Accordingly, the total number of instructions required for an image block compare might be more than double that given for the first example.

A related patent application, Ser. No. 10/403,977 filed 2003 Mar. 31, discloses parallel subword compare instructions that cause results to be stored at different subword locations with result registers so that results do not have to be shifted before they are combined. In a targeting approach, an instruction can specify a subword location for a result; in a shifting approach, the previous contents of a result register are shifted to a new subword location so that the results of a current operation can be stored in the original location without losing the previous results. In a replicating approach, complete replicas of the results are stored at multiple subword locations. Results from multiple parallel subword instructions can be combined using OR or MIX instructions without separate "shift instructions". This results in a ⅓ to ⅔ saving in the number of instructions required to combine a series of parallel compare instructions.

While the foregoing approach provides a substantial advance in computer performance, further advances are desired.

SUMMARY OF THE INVENTION

The present invention provides for parallel subword instructions that distribute results discontiguously in a result register. Preferably, the results are distributed among result-register bit positions so as to minimize the lateral movement of information between an operand register and the result register. In any event, the distribution should be such that the "maximum lateral movement" is less than it would be if the results were stored contiguously. Herein, results are stored discontiguously if there is at least one gap in the bit positions used for storing the results; in the preferred embodiments, no two result bit positions are contiguous.

To minimize the maximum lateral movement, the results of a subword operation can be stored within the corresponding subword location of the result register. For example, the results of each of plural parallel subword operations can be stored in the least-significant bit position of the corresponding subword location in the result register. This ensures that the maximum lateral movement is less than one subword, whereas the related art discussed requires lateral movement of at least one subword, and up to as much as the full datapath width.

The invention provides for "shifting" and "targeting" approaches. In the shifting approach, register contents are shifted so that the results of a prior operation are preserved when the results of the current operation are stored. For example, assume as a result of a parallel subword compare operation, results are stored in the least-significant bit positions of the result-register subword locations; the next iteration of that instruction shifts the prior results to the second-least-significant bit positions of the result-register subword locations, while storing the results of a present parallel subword compare operation in the least-significant bit positions of the result-register subword locations. An advantage of this shifting approach is that results are automatically combined as the instruction is iterated, obviating the need for additional (e.g., OR) instructions to combine results.

In the "targeting" approach, each of plural instructions specifies (implicitly or explicitly) the set of discontiguous bit positions to which a result is to be stored. For example, one instruction can specify the least-significant bit locations of the result-register subword locations, while another specifies the second-least-significant bit locations of the subword locations, and so on. In this example, there can be one instruction dedicated to each result-register subword bit position. By storing them in different sets of bit locations, the results of plural parallel subword instructions can be combined without shifting.

The invention provides "overwriting" and "content-preserving" variations of the targeting approach. In the content-preserving variation, result-register bit positions not used to store the result are left intact. This allows successive parallel subword compare operations (that specify different sets of bit positions) to write to the same result register so that their collective results are combined without further instructions. This approach minimizes the number of instructions required to achieve a combined result in a manner comparable to the shifting approach. In this case, the instructions do not require results to be shifted; on the other hand, the shifting approach does not require locations to be specified.

In the overwriting variation, bit positions not used for storing the result are overwritten, e.g., with zeroes. In this variation, the results of successive parallel subword operations can be written to different positions of different registers so that results can be combined (e.g., by ORing) without shifting. Since separate instructions are required to combine results, more instructions are required in the overwriting variation of the targeting approach than for the content-preserving variation of the targeting approach and for the shifting approach.

The number of instructions required to complete a task is not always the best indicator of performance. "Dependency-depth" can be a better measure where several instructions can be executed in parallel. In the shifting approach, the dependency depth equals the number of instructions, while in the targeting approach, the dependency depth can be much less as long as the parallel subword results are written to different registers.

The dramatic reduction in the maximum lateral movement provided by the invention corresponds to a significant reduction in the time required to execute an instruction. This reduction can be used to shorten the time allotted to an instruction cycle and, depending on the result of the instruction set, reduce the routing requirements for the incorporating microprocessor. Also, while normally the information from different instructions would be stored in non-overlapping sets of bit positions, the invention provides for storing information in overlapping bit positions, e.g., for encryption purposes. Other advantages and features in addition to or in lieu of the foregoing are apparent from the description below with reference to the following drawings.

BRIEF DESCRIPTION OF THE DRAWINGS

FIG. 2 is a more comprehensive view of the program segment of FIG. 1 showing eight parallel subword compare instructions and OR instructions used to combine subword compare results in accordance with the present invention.

DESCRIPTION OF THE PREFERRED EMBODIMENTS

In accordance with the present invention, a computer program 100 includes instructions selected from an instruction subset of distributed-result, overwriting, targeting parallel subword compare instructions PCompDOT0-PCompDOT7. These instructions can be parsed as follows: "Perform a parallel subword compare (using 8-bit subwords) and store the result of each parallel subword compare in the (n+1)st (n=0-7) least-significant bit position of the corresponding subword of the result register; overwrite with zeroes result-register bit positions not used for storing result data." For the present comparison operation, a "1" is to be stored when the corresponding subword contents are equal; otherwise a "0" is to be stored. However, other subword compare instructions can assign "1" and "0" outcomes based on other relations, e.g., such as "greater than or equal to".

Figure 1:
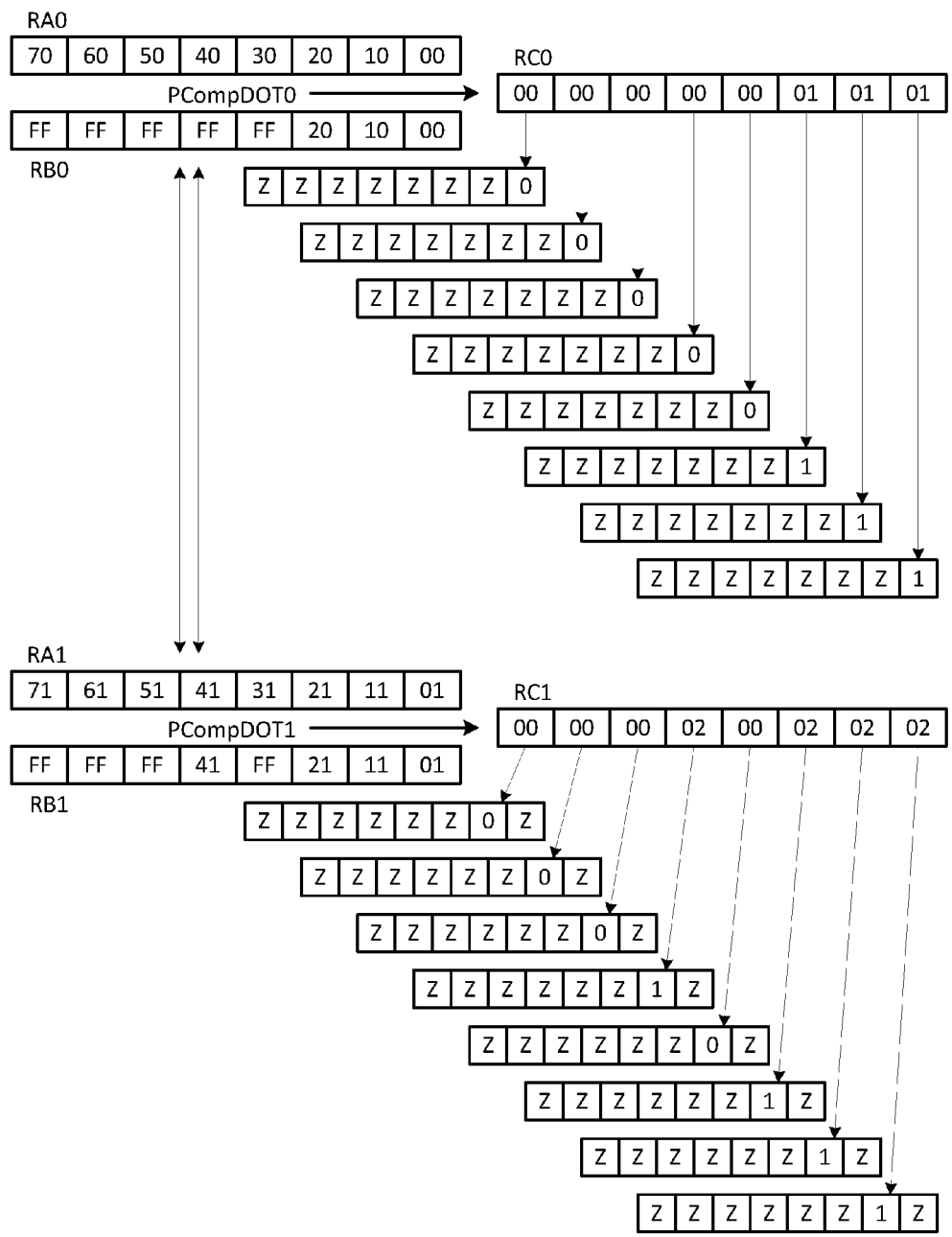
FIG. 1 is a schematic illustration of a part of a first computer program segment involving a pair of distributed overwriting targeting instructions in accordance with the present invention.

The operation of program 100 segment including PCompDOT0 and PCompDOT1 in succession is shown in FIG. 1. (The values in the full registers are in hexadecimal, while the values in the subword details are in binary.) Note that the results of PCompDOT0 are distributed among the least-significant bits of the subwords (bytes) of result register RC0, while the results of PCompDOT1 are distributed among the second-least-significant bits of the subwords of result register RC1. Bits not used for storing results are filled with default zeroes, shown in FIG. 1 as "Zs". A more comprehensive program segment including all eight instructions plus OR instructions for combining results is shown in FIG. 2, using the data indicated in FIG. 3.

Figure 4:
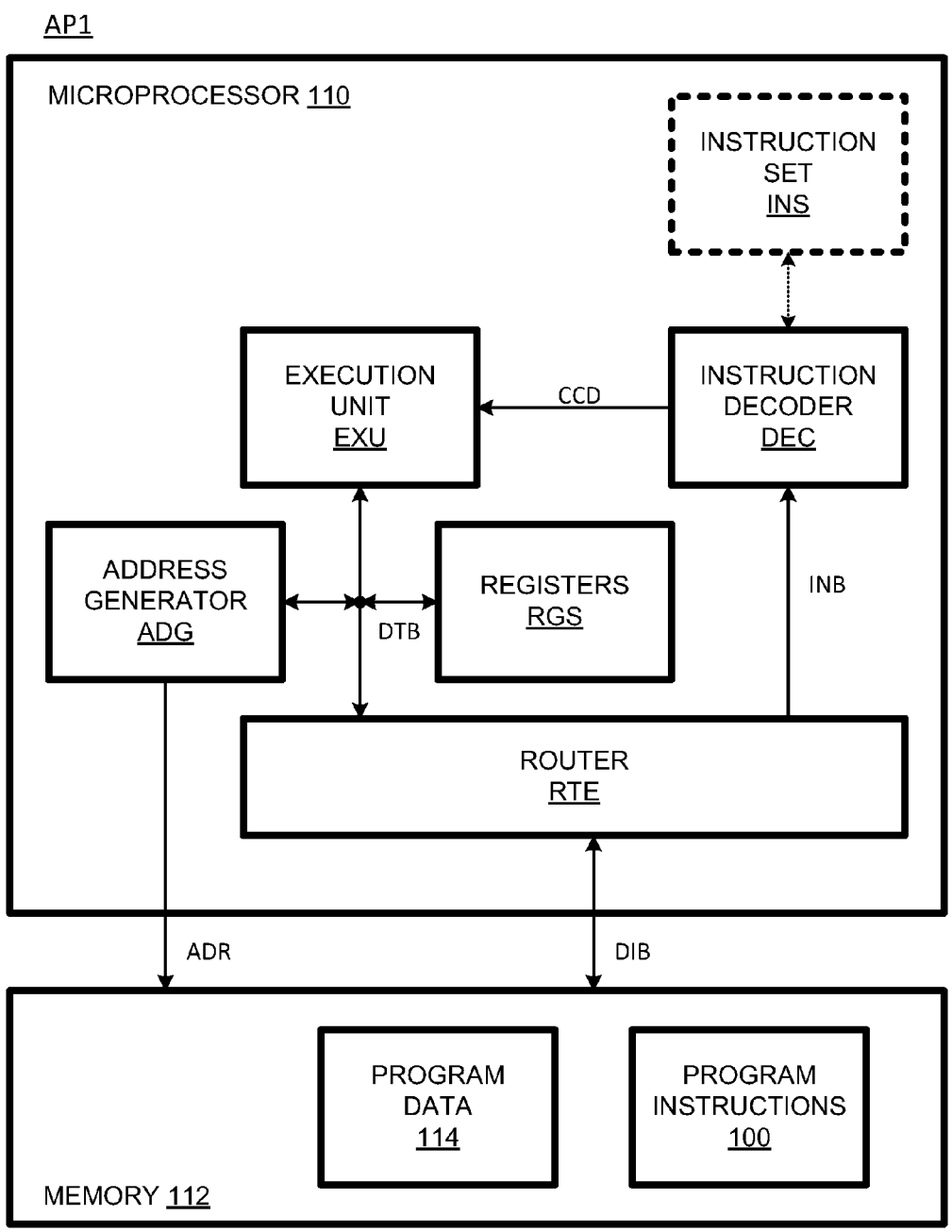
FIG. 4 is a schematic illustration of a system for executing the instructions of the computer program of FIG. 1.

These instructions are executed in the content of a computer system API, which includes a microprocessor 110 and memory 112, as shown in FIG. 4. The contents of memory 112 include program data 114 and instructions constituting program 100. Microprocessor 110 includes an execution unit EXU, an instruction decoder DEC, registers RGS, an address generator ADG, and a router RTE.

Generally, execution unit EXU performs operations on data 114 in accordance with program 100. To this end, execution unit EXU can command (using control lines ancillary to internal data bus DTB) address generator ADG to generate the address of the next instruction or data required along address bus ADR. Memory 112 responds by supplying the contents stored at the requested address along data and instruction bus DIB.

As determined by indicators received from execution unit EXU along indicator lines ancillary to internal data bus DTB, router RTE routes instructions to instruction decoder DEC via instruction bus INB and data along internal data bus DTB. The decoded instructions are provided to execution unit EXU via control lines CCD. Data is typically transferred in and out of registers RGS according to the instructions.

Associated with microprocessor 110 is an instruction set of instructions INS that can be decoded by instruction decoder DEC and executed by execution unit EXU. Program 100 is an ordered set of instructions selected from instruction set INS. For expository purposes, microprocessor 110, its instruction set INS and program 100 provide examples of all the instructions described below. The present invention also provides embodiments using some but not all the novel instructions described herein.

The program segment shown in FIG. 2 comprises all eight PCompDOT0-PCompDOT7 instructions and seven OR instructions, for a total of fifteen instructions. The instructions are arranged in four columns in FIG. 2, with each column corresponding to one-level of dependency depth for a total dependency depth of four. The results of the PCompDOT0-PCompDOT7 instructions (applied to the data indicated in FIG. 3) are shown stored in registers RC0-RC7. The results of the first set of four OR instructions are shown in registers RD0-RD3; the results of the second set of two OR instructions are shown in registers RE0 and RE1; and the result of the final OR instruction is shown in result register RF0.

Figure 3:
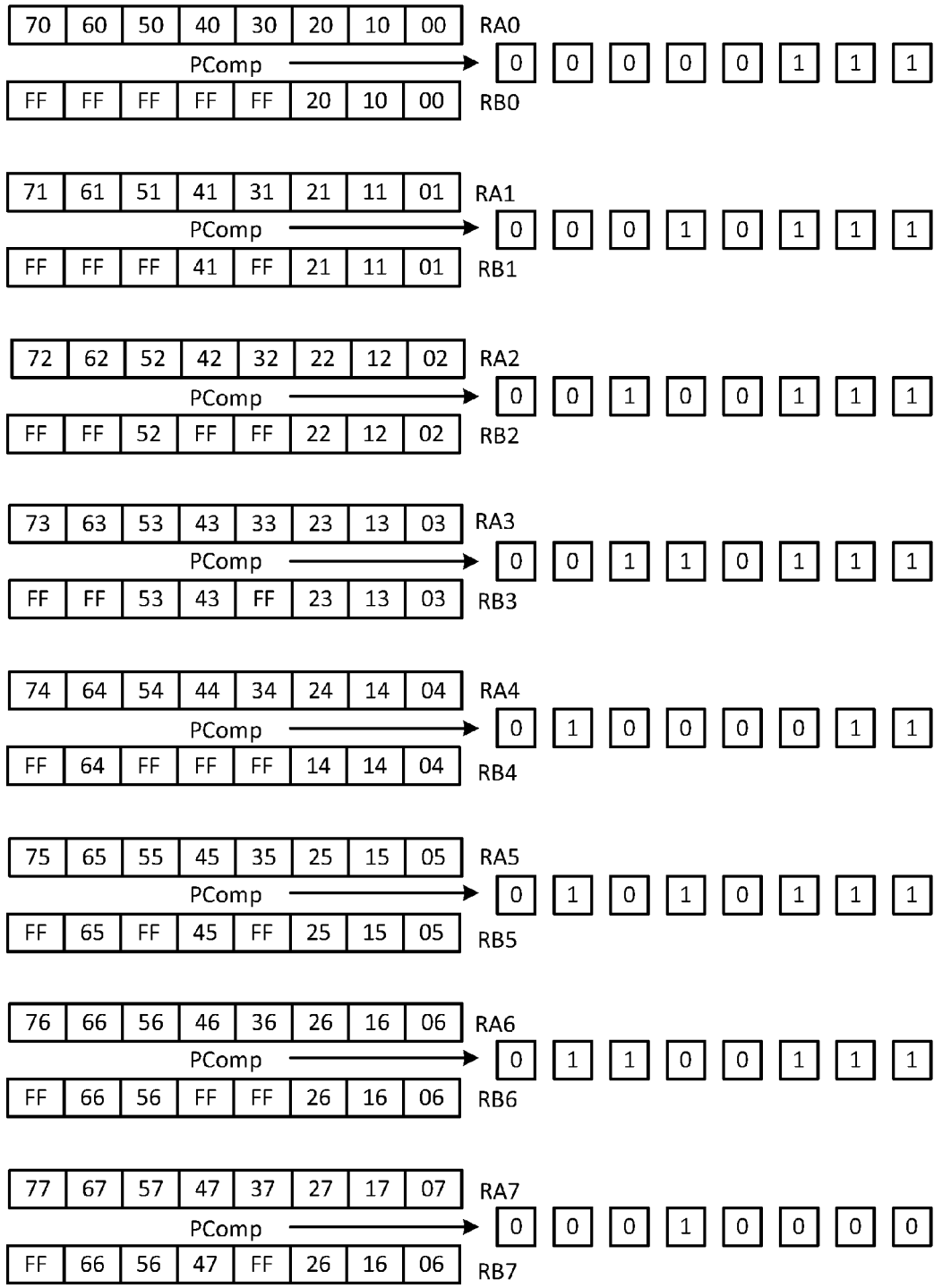
FIG. 3 presents contrived operand data and results used to explain the operation of the present invention.

The data presented used throughout this application has been selected to facilitate explanation of the inventive instructions; this data is shown in FIG. 3 for a generic parallel compare instruction PComp. The data in operand registers RA0-RA7 and RB0-RB7 is in hexadecimal format, while the results are shown in binary format. The bit values of the results are spaced to indicate that they are distributed in the result registers.

Figure 5:
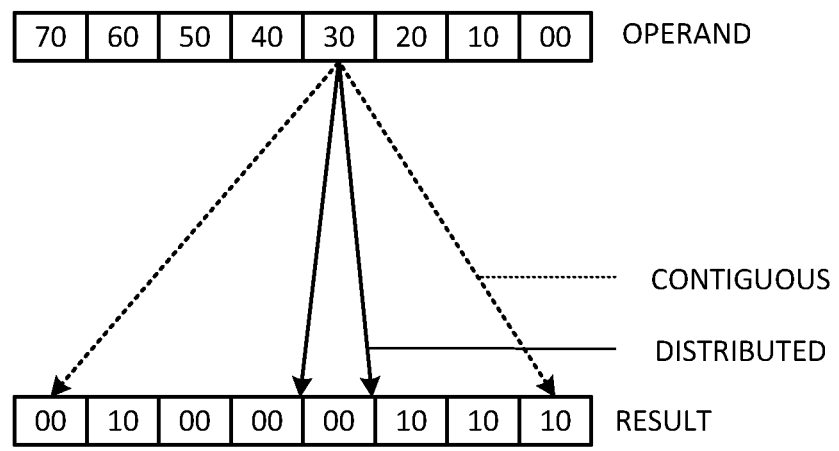
FIG. 5 compares the maximum lateral movement provided for by the present invention with the maximum lateral movement required by some related-art parallel subword compare instructions.

The reduction of maximum lateral movement provided by the invention is indicated in FIG. 5. The maximum lateral movement required by the distributed approach of the present invention is indicated by the solid arrows, while the maximum lateral movement required by contiguous approaches of the related art is shown by the dotted arrows for a typical operand subword. The present invention allows information to remain within subwords so that the maximum lateral movement is less than one subword. Contiguous storage of results causes the maximum lateral movement to exceed one subword. For example, where the results are stored contiguously in the least-significant subword of the result register, the lateral movement associated with the most-significant operand bit is the entire register less one subword. Thus, the present invention greatly reduces the maximum lateral movement of information, allowing simpler routing between registers, faster movement of data, and thus greater processor performance.

Another segment of program 100 uses distributed-result, content-preserving, targeting parallel subword compare instructions PCompDPT0-PCompDPT7. These instructions can be parsed as follows: "Perform a parallel subword compare (using 8-bit subwords) and store the result of each parallel subword compare in the (n+1)st (n=0-7) least-significant bit position of the corresponding subword of the result register; leave unchanged result-register bit positions not used for storing result data." The operation of a successive pair with PCompDPT0 and PcompDPT1 is shown in FIG. 7. The results of PCompDPT0 are stored in the least-significant bits of the subwords of result register RC0 (as they were for PCompDOT0). However, the bit positions not used for storing the results are filled with data pre-existing in register RC0, as indicated by the use of X's instead of Z's in FIG. 6.

Figure 6:
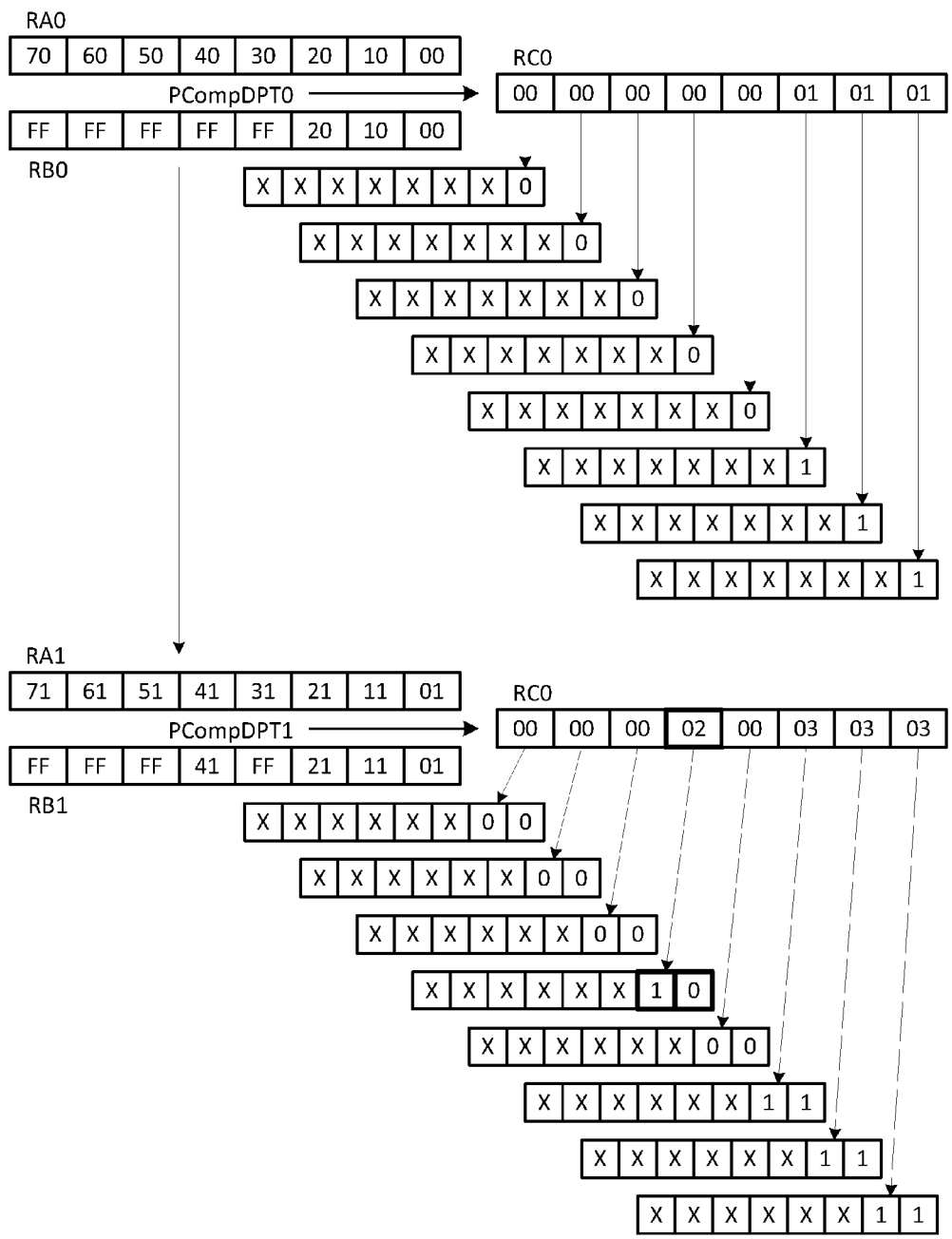
FIG. 6 is a schematic illustration of a part of a second computer program segment illustrating the operation of a successive pair of distributed content-preserving targeting instructions.
Figure 7:
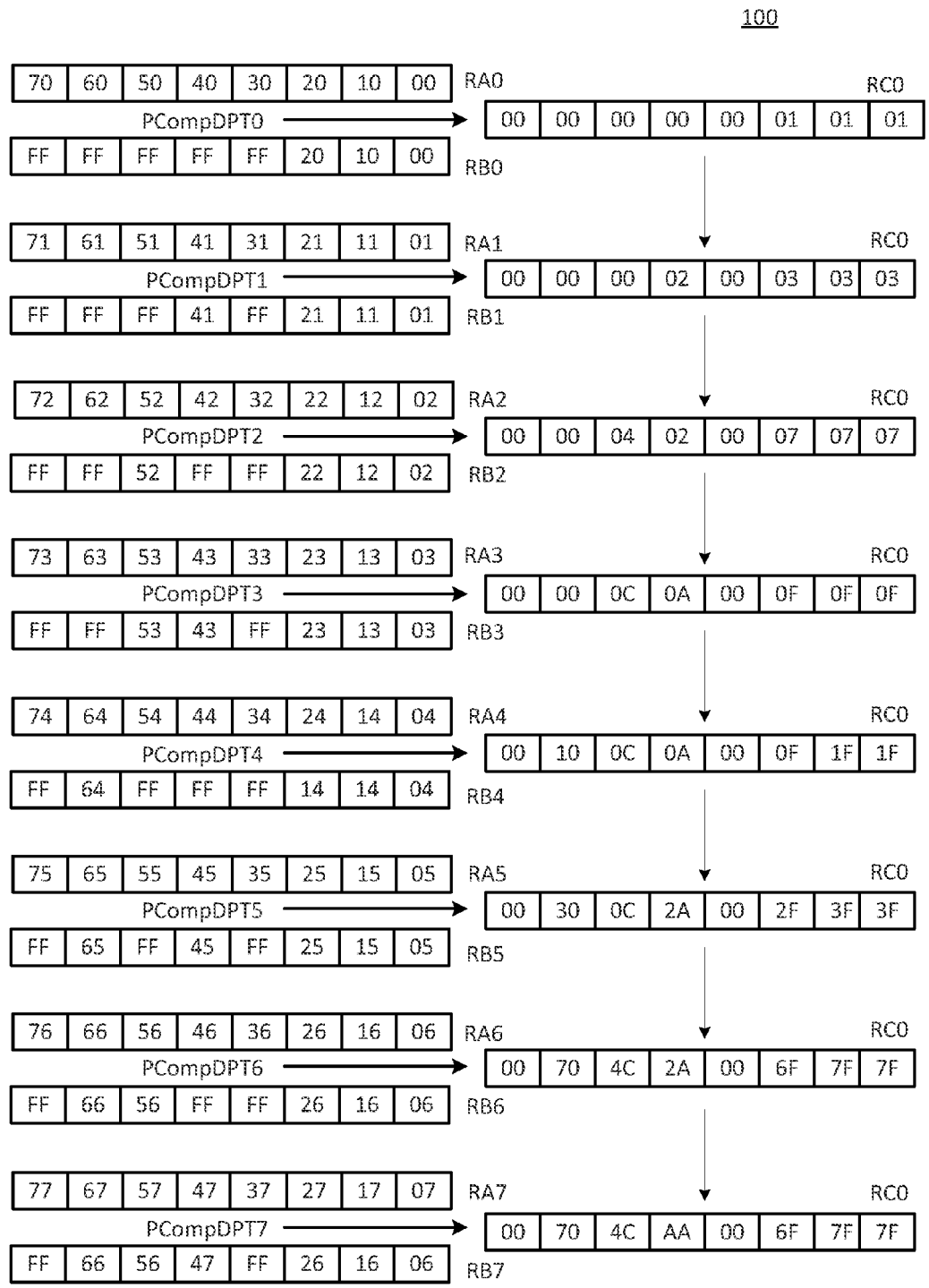
FIG. 7 is a more comprehensive view of the segment of FIG. 6 encompassing eight successive distributed content-preserving targeting instructions in accordance with the present invention.

This difference between the overwriting instructions of FIG. 1 and the content-preserving instructions of FIG. 6 is made clearer with reference to the results of PCompDPT1. The results for this instruction are written to the second-least-significant bit positions of the results register subword locations. In this case, the results are written to the same result register RC0 as were the results of PCompDPT0, so the results are combined without further instructions. Thus, the desired combined result is found in result register RC0 after only eight instructions, as shown in FIG. 7 (using the data of FIG. 4). However, the dependency depth is eight, so there is less opportunity to take advantage of parallelism provided by microprocessor 110.

In the targeting variants of parallel subword compare instruction, a result location must be specified, either implicitly or explicitly. It can be specified implicitly by using different instructions for each subword location. It can be specified explicitly by a value entered in a field reserved in the instruction for that purpose. Alternatively, the instruction can point explicitly or implicitly to a location in which a value indicating the location is stored. For example, an instruction can point to a register in which a value is stored indicating the subword location at which the result is to be stored. Another alternative is to tie the subword location to the register in which the result is to be stored. For example, results stored in register RC0 can be stored in its least-significant subword positions, while results stored register RC1 can be stored in its second-least-significant subword positions.

Figure 8:
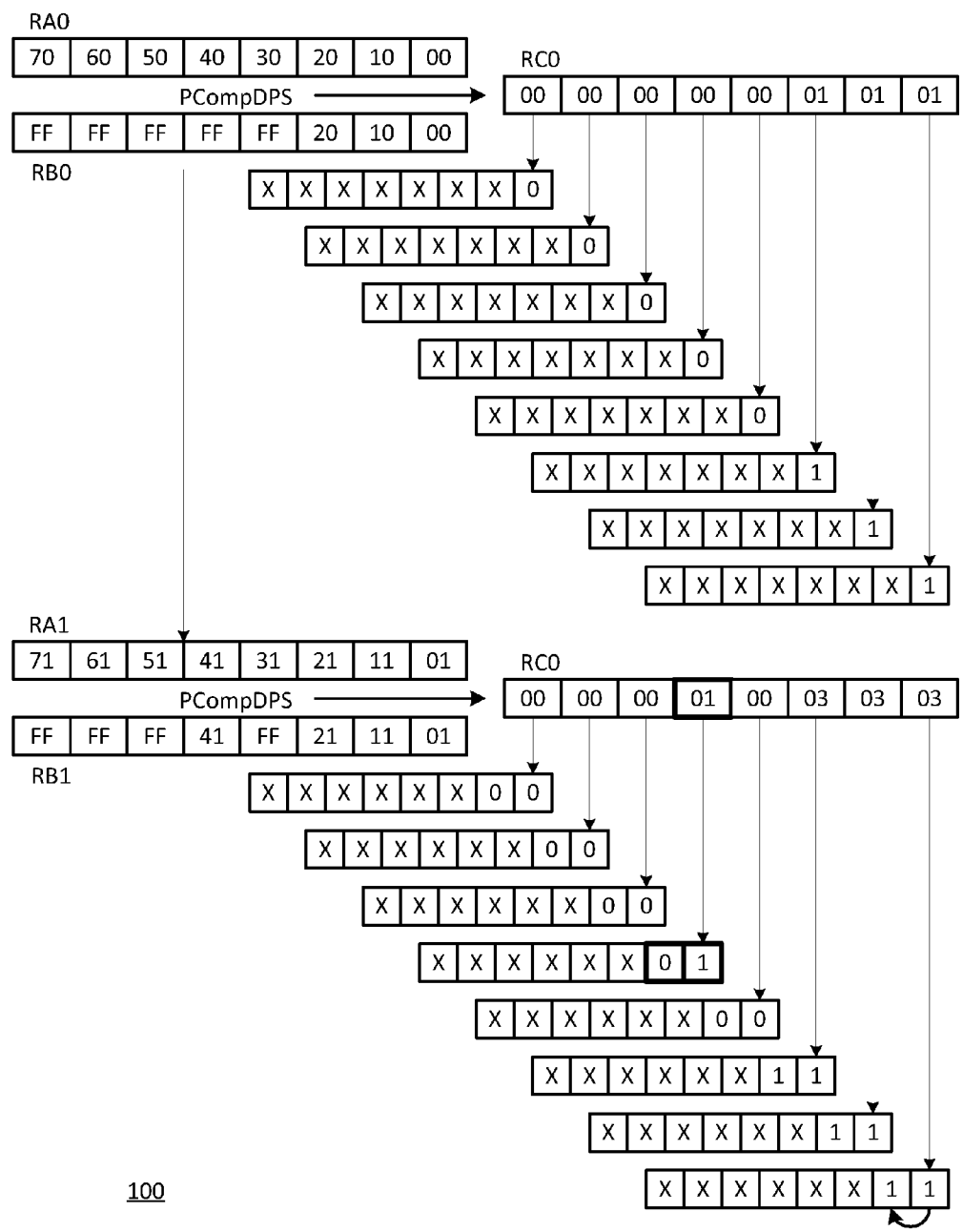
FIG. 8 is a schematic illustration of a part of a third computer program segment including a pair of distributed shifting instructions in accordance with the present invention.
Figure 9:
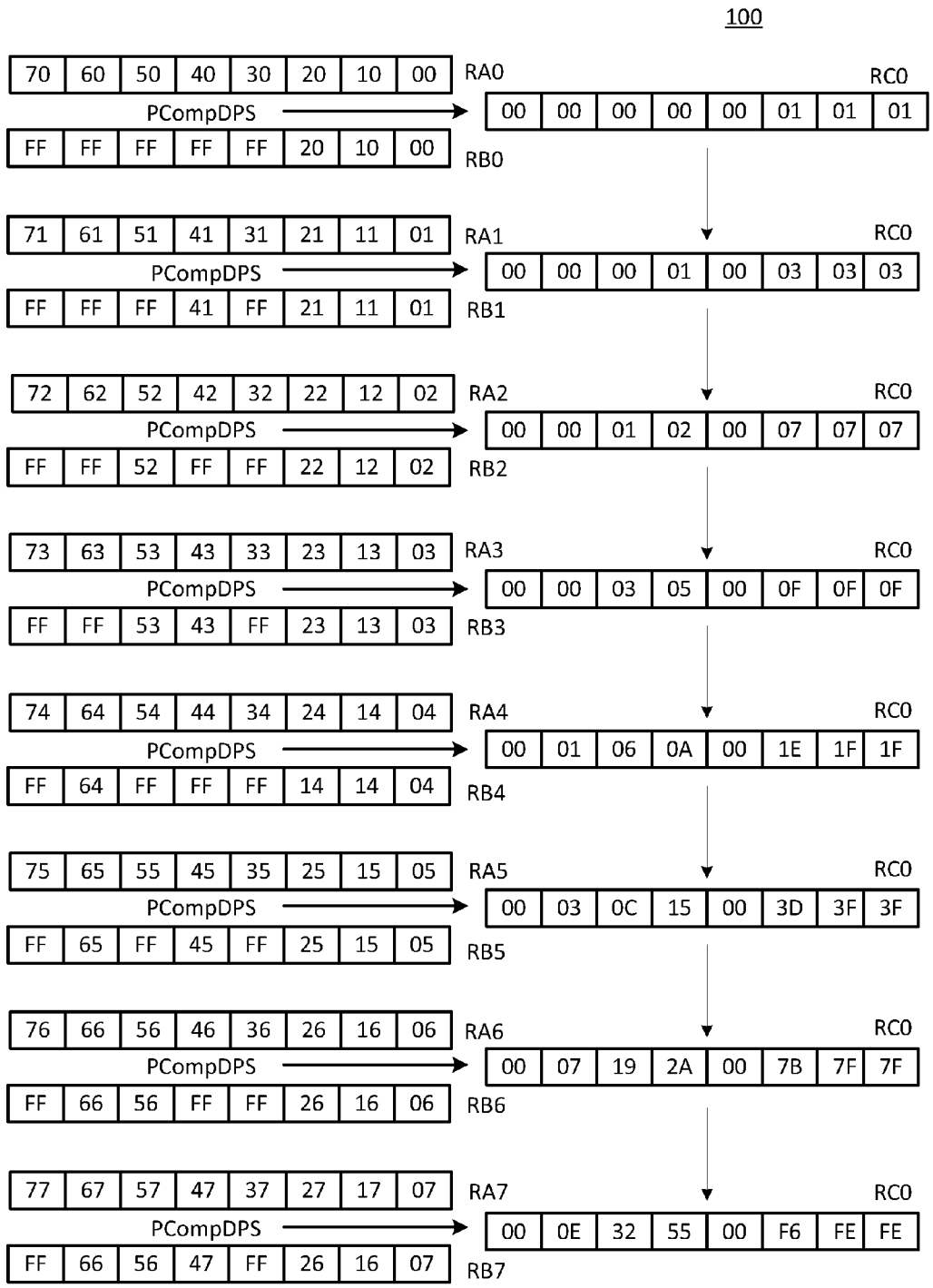
FIG. 9 is a more comprehensive view of the third computer program segment showing eight successive distributed shifting instructions in accordance with the present invention.

A program segment using distributed, content-preserving, shifting parallel subword compare instructions PCompDPS is shown in FIGS. 8 and 9. This instructions can be parsed as follows: "Perform a parallel subword compare (using 8-bit subwords) and store the result of each parallel subword compare in the least-significant bit position of the corresponding subword of the result register; shift pre-existing data one-bit position to the left, dropping the pre-existing most-significant bit of each subword." In this case, there is only one result destination, and thus only one instruction (as opposed to eight instructions each for the two targeting subsets of instructions).

The result of PCompDPS, as shown in FIG. 8, appears identical with the results of PCompDPT0 of FIG. 6. However, instead of leaving pre-existing data in place, PCompDPS shifts preexisting data one-bit to the left. The most-significant pre-existing data bits for each subword are dropped and the vacated least-significant bit positions for the subwords are filled with the instruction results.

This shifting is more clearly illustrated in connection with the second PCompDPS in FIG. 8. Note that the results of the first PCompDPS are shifted to the left by one bit and the results of the second PCompDPS are again stored in the least-significant-bit positions of the subwords. Examination of the two least-significant bits (emphasized in FIG. 8) of the fifth least-significant subword (also emphasized in FIG. 8)

differ from the corresponding results (emphasized in FIG. 6) for PCompDPT1. Obviously, the information is the same, but it is expressed differently due to the different ordering conventions associated with PCompDPTn and PCompDPS. Since content is shifted and preserved, successive PCompDPS instructions can write to the same register so that after eight instructions, the desired combined result is obtained. As with the content-preserving targeting instructions, the program segment length and the dependency depth are both eight.

Figure 10:
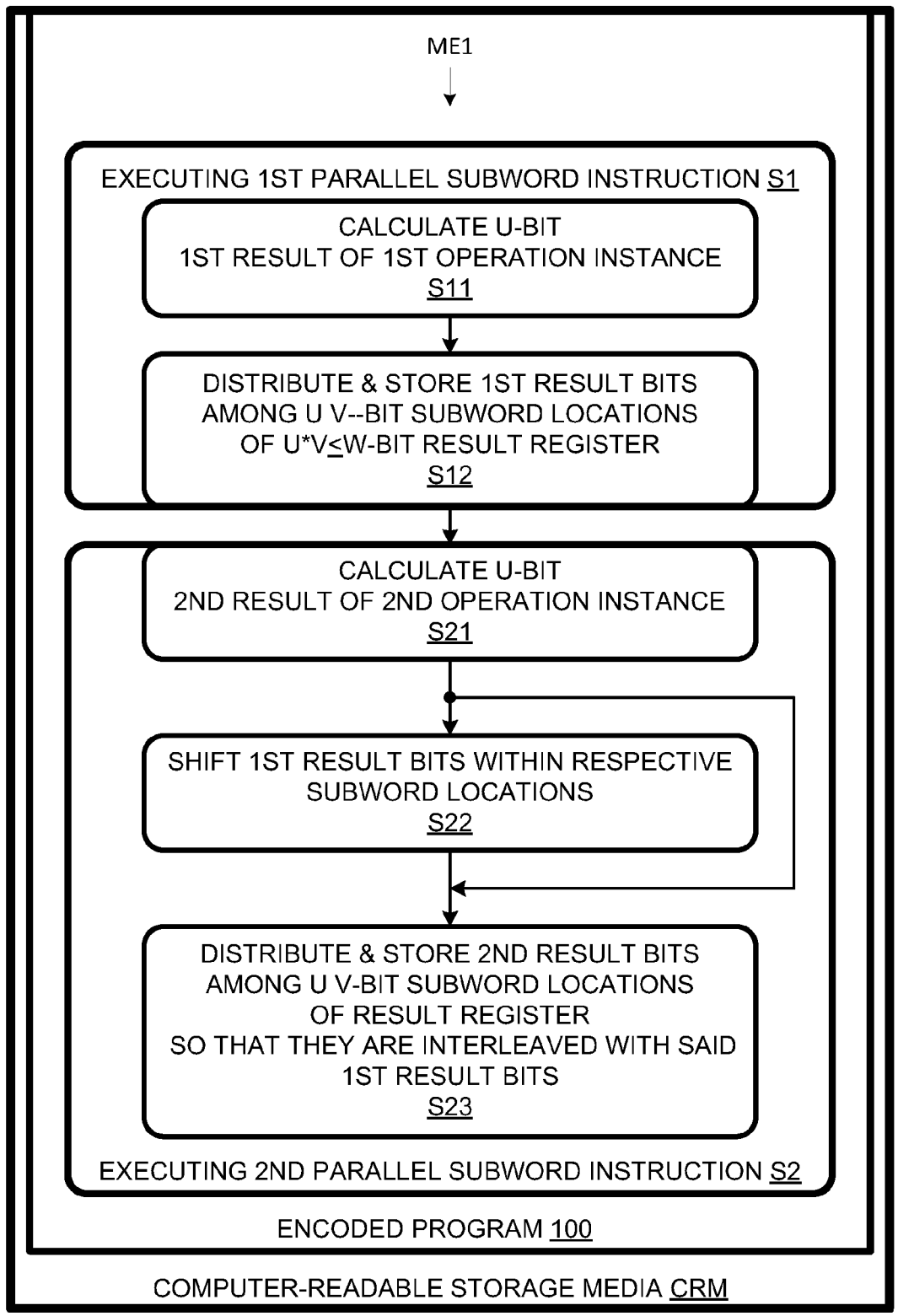
FIG. 10 is a schematic illustration of computer-readable storage media CRM encoded with program 100 (FIG. 4) of computer-executable instructions.

FIG. 10 is a schematic illustration of computer-readable storage media CRM encoded with program 100 (FIG. 4) of computer-executable instructions, including a first parallel-subword instruction S1 and a second parallel subword instruction S2. The parallel-subword instructions can be, for example, parallel-compare instructions. Program 100, when executed by microprocessor 110, implements a method ME1, including steps S11 and S12, which are implemented pursuant to execution of instruction S1, and including steps S21 and S22, which are implemented pursuant to execution of instruction S2. Some iterations of method ME1 also include a shifting step S22 that is implemented during execution of instruction S2.

Each instruction S1, S2, calculates, distributes, and stores a respective U-bit result in U V-bit subword locations of a W-bit word-size register, W≥U*V. For microprocessor 110 (FIG. 4) U=32, V=8, and W=256. The bits are stored in a set of discontiguous bit locations of the result register.

Step S11 involves calculating a U-bit first result of a first instance of an operation. Step S12 involves distributing and storing the bits of the U-bit first result among U V-Bit subword locations of result register RC0. For the instructions represented in FIGS. 6 and 8, the 32-bit results and their distribution within result register RC0 are shown at the uppermost instance of result register RC0 in those figures.

Step S21 involves calculating a U-bit second result of a second instance of an operation. In some iterations of method ME1, the first and second instances are of the same operation, whereas in other iterations of method ME1, the operations are different. Step S23 involves distributing and storing the bits of the U-bit second result among U V-Bit subword locations of result register RC0 so that the first result bits and the second result bits are interleaved in that between any two bits of one result is at least one bit of the other result. For the instructions represented in FIGS. 6 and 8, the 32-bit results and their distribution within result register RC0 are shown at the lower instance of result register RC0 in those figures.

Upon completion of step S23 and of method ME1 the first and second results are concurrently stored and interleaved within result register RC0. The invention provides for alternative ways of achieving this outcome. In the case of the PCompDPT instruction of FIG. 6, second instruction S2 (PCompDPT1) writes the bits of the second result to different bit positions within result RC0 than were used by the first instruction S1 (PCompDPT0) to store the bits of the first result. Thus, the PCompDPT instruction is represented in FIG. 10 by the arrow bypassing step S22. In the case of the PCompDPS instruction of FIG. 8, the second instruction S2 (PCompDPS) shifts the bits of the first result one bit to the left so that the bits of the second result can be stored in the same bit positions in which the first result bits were originally stored. Thus, the PCompDPS instruction involves shifting step S22.

Instructions S1 and S2 store results discontiguously within result register RC0 in that between any two bits of an operation result in register RC0 there exists at least one bit location not containing a bit of that operation result. In the case of the instructions represented in FIGS. 6 and 8, between any two bits of the same operation-instance result, there are seven bit locations not containing a bit of that result.

Thus, each result initially occupies a respective (first or second) set of discontiguous result-register bit locations. For the PCompDPT instruction of FIG. 6, the sets for the first and second instructions are mutually exclusive. For the PCompDPS instruction of FIG. 8, the sets intersect and, in fact, are identical. The second instruction result bits do not erase the first result bits as the latter are shifted to a new set of discontiguous result bit locations. The new set is mutually exclusive with respect to the first and second sets.

Thus, method ME1 achieves the practical result of packed results without separate packing instructions. Of course, method ME1 can be extended to fill the result register as shown in FIGS. 7 and 9. Obviating the need for separate packing instructions translates to a performance improvement, which is critical in such applications as video processing.

"Computer-readable storage media" is a manufacture in which data and instructions can be encoded (either during manufacture or during use) for non-transitory storage. "Computer-readable storage media" encompasses memory 112, such as memory 112 and hard disks, as well as delivery media such as read-only optical disks. Method ME1, program 100, and instructions S1 and S2 involve physical transformations of state in computer-readable storage media, e.g., memory 112. In this sense, the results are tangible. The results are concrete in that they yield repeatable results given the same operands and instructions. The results are useful in that the self-packing instructions obviate the need for separate packing instructions and, thus, permit higher performance video processing, which in turn provides for higher quality video presentations.

While it is contemplated that the two consecutive comparison (or other characterizing) instructions be of the same type, the invention does not require this. For example, a shifting-type instruction can follow a targeting instruction and vice-versa. Furthermore, the operations called for by the two instructions need not be the same; for example, one could be a binary compare and the other an "equals zero" instruction.

Thus, the present invention provides for different types of instructions that, like those disclosed in Ser. No. 10/403,977 filed 2003 Mar. 31, can reduce substantially the number of instructions required for parallel-subword compare instructions. In the illustrated embodiments, the registers are 64 bits and the subwords are 8 bits, so that there are 8 mutually exclusive subword locations per register. Due to this choice of register and subword sizes, the results are one subword long. If longer subwords are used, e.g., 16 bits, there are only 4 16-bit subwords per 64-bit register, and thus 4 bits per result. Thus, there can be 16 mutually exclusive 4-bit result locations in a register. The instruction set can be designed to permit any of these to be selected for a parallel subword compare operation. Thus, one format for such an instruction can be PComp (first operand register, second operand register, result register, subword size, target location in result register for result).

In the foregoing description, results of different operations were stored at different bit positions, either in the same or different result registers. However, encryption applications can call for some overlap in the sets of bit positions used for storing results. For example, sets of target-bit positions can overlap; for another example, a shifting instruction may shift some but not all of the preceding contents. If the results are written to the same register, some preceding results are overwritten; if the results are written to different registers, some information can be masked when the results are combined, e.g., using an XOR instruction. The lost information may be supplied separately according to an encryption key available only to intended recipients.

The present invention applies not only to compare operations, but to other operations, including unary, binary, and higher-order operations. Register lengths can vary and need not be a power of two. Subword lengths can vary and need not be a power of two. Bits of the result register not determined by the operation result can be left unchanged or set to either zero or one. These and other modifications to and variations upon the illustrated embodiments are provided for by the present invention, the scope of which is limited only by the following claims.

The invention claimed is:

1. A microprocessor comprising:
   an instruction decoder for decoding instructions; and
   an execution unit for executing said instructions, said execution unit, when executing a first instruction of said instructions, regardless of any operand value to which said first instruction is applied,
      calculating a U-bit first result of a first operation instance, said first result having U first-result bits, and
      distributing and storing said first-result bits among plural multi-bit subword locations of a W-bit result register, wherein each of said multi-bit subword locations consists of contiguous bit positions, and
   said execution unit, when executing a second instruction of said instructions, regardless of any operand value to which said second instruction is applied,
      calculating a U-bit second result of a second operation instance, said second result having U second-result bits, and
      distributing and storing said second-result bits among said subword locations of said result register so that said first-result bits and said second-result bits are interleaved in said result register.

2. A microprocessor as recited in claim 1 wherein said execution unit stores said first-result bits in a first set of discontiguous bit locations of said result register and stores said second-result bits in a second set of discontiguous bit locations of said result register.

3. A microprocessor as recited in claim 2 wherein said sets are mutually exclusive.

4. A microprocessor as recited in claim 2 wherein said sets are identical.

5. A microprocessor as recited in claim 4 wherein said execution unit, when executing said second instruction, shifts said first-result bits to a third set of bit locations within said result register, said third set and said second set being mutually exclusive.

6. A microprocessor as recited in claim 1 wherein said first operation instance and said second operation instance are instances of the same operation.

7. A microprocessor as recited in claim 6 wherein said same operation is a parallel compare operation.

8. A method involving physical transformations, said method comprising:
   in the course of executing a first parallel-subword instruction, regardless of any operand value to which said first instruction is applied,
      calculating a U-bit first result of a first operation instance, said first result having U first-result bits, and
      distributing and storing said first-result bits among plural multi-bit subword locations of a W-bit result register, wherein each of said subword locations consists of plural contiguous bit positions; and
   in the course of executing a second parallel-subword instruction, regardless of any operand value to which said second instruction is applied,
      calculating a U-bit second result of a second operation instance, said second result having U second-result bits, and
      distributing and storing said second-result bits among said subword locations of said result register so that said first-result bits and said second-result bits are interleaved in said result register.

9. A method as recited in claim 8 wherein said storing of said first result bits involves storing said first-result bits in a first set of discontiguous bit locations of said result register, said storing said second-result bits involving storing said second-result bits in a second set of discontiguous bit locations of said result register.

10. A method as recited in claim 9 wherein said sets are mutually exclusive.

11. A method as recited in claim 9 wherein said sets are identical.

12. A method as recited in claim 11 wherein said second instruction, when executed, shifts said first-result bits to a third set of bit locations within said result register, said third set and said second set being mutually exclusive.

13. A method as recited in claim 8 wherein said first operation instance and said second operation instance are instances of the same operation.

14. A method as recited in claim 13 wherein said same operation is a parallel compare operation.

15. A manufacture comprising non-transitory computer-readable storage media having encoded thereon a program of instructions, said instructions including first and second instructions, said first instruction, when executed by an execution unit, regardless of any operand value to which said first instruction is applied,
   calculating a U-bit first result of a first operation instance, said first result having U first-result bits, and
   distributing and storing said first-result bits among plural multi-bit subword locations of a W-bit result register, wherein each of subword locations consists of plural contiguous bit positions, and
   said second instruction, when executed by said execution unit, regardless of any operand value to which said second instruction is applied,
   calculating a U-bit second result of a second operation instance, said second result having U second-result bits, and
   distributing and storing said second-result bits among said subword locations of said result register so that said first-result bits and said second-result bits are interleaved in said result register.

16. A manufacture as recited in claim 15 wherein said execution unit stores said first-result bits in a first set of discontiguous bit locations of said result register and stores said second-result bits in a second set of discontiguous bit locations of said result register.

17. A manufacture as recited in claim 16 wherein said sets are mutually exclusive.

18. A manufacture as recited in claim 16 wherein said sets are identical.

19. A manufacture as recited in claim 18 wherein said execution unit, when executing said second instruction, shifts said first-result bits to a third set of bit locations within said result register, said third set and said second set being mutually exclusive.

20. A manufacture as recited in claim 15 wherein said first operation instance and said second operation instance are instances of the same operation.

21. A manufacture as recited in claim 20 wherein said same operation is a parallel-compare operation.

22. A manufacture comprising non-transitory computer-readable storage media having encoded thereon a program of computer-executable instructions, said program comprising a parallel subword instruction that, when executed, regardless of any operand value to which said parallel subword instruction is applied, computes a U-bit result, shifts data stored at a first set of bit locations of a result register to a second set of bit locations of said result register, and stores said result in said first set of bit locations, wherein the bit locations of said first set are discontiguous in that between bit locations storing bits of said U-bit result are bit locations of said result register not storing any bits of said U-bit result.

23. A manufacture as recited in claim 22 wherein the sum of the numbers of bit locations in said first and second sets is less than the number of bit locations in said result register.

* * * * *